(12) United States Patent
Bai et al.

(10) Patent No.: US 11,354,832 B2
(45) Date of Patent: Jun. 7, 2022

(54) GENERATION OF ACCURATE HYBRID DATASETS FOR QUANTITATIVE MOLECULAR IMAGING

(71) Applicant: KONINKLIJKE PHILIPS N.V., Eindhoven (NL)

(72) Inventors: Chuanyong Bai, Solon, OH (US); Andriy Andreyev, Willoughby Hills, OH (US); Xiyun Song, Cupertino, CA (US); Jinghan Ye, Livermore, CA (US); Bin Zhang, Cleveland, OH (US); Shekhar Dwivedi, Willoughby Hills, OH (US); Yanfei Mao, Highland Heights, OH (US); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 66 days.

(21) Appl. No.: 16/609,890

(22) PCT Filed: May 1, 2018

(86) PCT No.: PCT/EP2018/061083
§ 371 (c)(1),
(2) Date: Oct. 31, 2019

(87) PCT Pub. No.: WO2018/202648
PCT Pub. Date: Nov. 8, 2018

(65) Prior Publication Data
US 2020/0202591 A1 Jun. 25, 2020

Related U.S. Application Data
(60) Provisional application No. 62/492,422, filed on May 1, 2017.

(51) Int. Cl.
*G06T 11/00* (2006.01)
*G06T 5/50* (2006.01)
*G06T 7/00* (2017.01)

(52) U.S. Cl.
CPC .............. *G06T 11/008* (2013.01); *G06T 5/50* (2013.01); *G06T 7/0012* (2013.01);
(Continued)

(58) Field of Classification Search
CPC ....... G06T 11/003; G06T 11/008; G06T 5/50; G06T 7/0012; G06T 2207/10104;
(Continued)

(56) References Cited

U.S. PATENT DOCUMENTS 9,036,771 B2 * 5/2015 Yu .......................... A61B 6/583
378/19
9,547,893 B2 * 1/2017 Couch .................... A61B 6/583
(Continued)

FOREIGN PATENT DOCUMENTS

EP 2360643 A1 8/2011
WO 2016077554 A1 5/2016
(Continued)

OTHER PUBLICATIONS

Berthon, Beatrice et al "PETSTEP: Generation of Synthetic PET Lesions for Fast Evaluation of Segmentation Methods", Physica Medica, vol. 31, 2015, pp. 969-980.
Le Maitre, Amandine et al "Incorporating Patient-Specific Variability in the Simulation of Realistic Whole-Body F-FDG Distributions for Oncology Applications", Proceedings of the IEEE, vol. 97, No. 12, Dec. 2009, pp. 2026-2038.
(Continued)

*Primary Examiner* — Vu Le
*Assistant Examiner* — Julius Chai

(57) ABSTRACT

A non-transitory computer readable medium storing instructions readable and executable by an imaging workstation (14) including at least one electronic processor (16) to perform a dataset generation method (100) operating on emission imaging data acquired of a patient for one or more
(Continued)

axial frames at a corresponding one or more bed positions, the method comprising: (a) identifying a frame of interest from the one or more axial frames; (b) generating simulated lesion data by simulating emission imaging data for the frame of interest of at least one simulated lesion placed in the frame of interest; (c) generating simulated frame emission imaging data by simulating emission imaging data for the frame of interest of the patient; (d) determining a normalization factor comprising a ratio of the value of a quantitative metric for the simulated patient data and the value of the quantitative metric for the emission imaging data acquired of the same patient for the frame of interest; and (e) generating a hybrid data set comprising the emission imaging data acquired of the patient for the one or more axial frames at the corresponding one or more bed positions with the frame of interest replaced by a combination of the simulated lesion data scaled by the normalization factor and the emission imaging data acquired of the patient for the frame of interest.

18 Claims, 3 Drawing Sheets

(52) U.S. Cl.
CPC ............... *G06T 2207/10104* (2013.01); *G06T 2207/20221* (2013.01); *G06T 2207/30096* (2013.01)

(58) Field of Classification Search
CPC ........... G06T 2207/20221; G06T 2207/30096; G16H 50/20
See application file for complete search history.

(56) References Cited

U.S. PATENT DOCUMENTS

| | | | |
|---|---|---|---|
| 9,886,765 B2* | 2/2018 | Naito | A61B 6/5294 |
| 2010/0322375 A1* | 12/2010 | Hirokawa | A61B 6/032 378/4 |
| 2014/0126794 A1* | 5/2014 | Ahn | G06T 11/008 382/131 |
| 2017/0053423 A1 | 2/2017 | Ahn | |
| 2017/0332983 A1 | 11/2017 | Tai | |
| 2020/0258271 A1* | 8/2020 | Zhu | G06T 11/006 |

FOREIGN PATENT DOCUMENTS

| | | |
|---|---|---|
| WO | 2016178116 A1 | 11/2016 |
| WO | 2017085587 A1 | 5/2017 |

OTHER PUBLICATIONS

Asma, E. et al. "Accurate and Consistent Lesion Quantitation with Clinically Acceptable Penalized Likelihood Images", IEEE NSS/MIC Conference Record, M23-7, pp. 4062-4066, 2012.
Daube-Witherspoon, et al "Determination of Accuracy and Precision of Lesion update Measurement in Human Subject with Time-of-Flight PET", Journal Nuclear Medicine, vol. 55, pp. 1-6, 2014.
Stute, S. et al. "LuCaS: Efficient Monte Carlo Simulations of Highly Realistic PET Tumor Images", IEEE NSS Conference Proceedings, M06-241, 2008—ab.
Zaidi, Habib et al. "Review of Computational Anthropomorphic Anatomical and Physiological Models", Proceedings of the IEEE, vol. 97, No. 12, Dec. 2009.
International Search Report and Written Opinion of PCT/EP2018/061083, dated Aug. 20, 2018.

* cited by examiner

US 11,354,832 B2

GENERATION OF ACCURATE HYBRID DATASETS FOR QUANTITATIVE MOLECULAR IMAGING

CROSS-REFERENCE TO PRIOR APPLICATIONS

This application is the U.S. National Phase application under 35 U.S.C. § 371 of International Application No. PCT/EP2018/061083, filed on May 1, 2018, which claims the benefit of U.S. Provisional Patent Application No. 62/492,422, filed on May 1, 2017. These applications are hereby incorporated by reference herein.

FIELD

The following relates generally to the medical imaging arts, medical image interpretation arts, medical imaging device performance evaluation and optimization arts, image simulation arts, and related arts.

BACKGROUND

A medical imaging device is a medical instrument with diverse applications. In quantitative molecular imaging, the imaging device is used to generate quantitative information about a tumor or other anatomical feature. For such tasks, the imaging data generated by the medical imaging device is reconstructed using an image reconstruction process and the resulting reconstructed image is further processed to generate the quantitative information. Quantitative molecular imaging is impacted by numerous parameters, e.g. spatial resolution of the imaging device, the type and dosage of radiopharmaceutical administered to the patient, the size, weight, and other characteristics of the patient, the type and location of the tumor or other anatomical feature under analysis, and so forth. Evaluation and optimization of a medical imaging device for performing quantitative molecular imaging is challenging due to the large number of such parameters and their varied and often intertwined impact on the imaging results. Evaluation of advanced data processing used in quantitative molecular imaging requires the knowledge of the ground truth for the evaluation. Such evaluation include how time-of-flight, resolution recovery, regularized reconstruction, etc. affect the SUV (standardized uptake value) or other quantitative activity metric of tumors in patient studies.

Due to the complexity of the medical imaging process, it is in principle preferable to use real patient data, that is, medical imaging data actually acquired of a human subject having a tumor or other anatomical feature of the type of interest. However, in real patient data, the absolute quantitation of the tumor/organ uptake is unknown, thus the evaluation does not really have a ground truth to use.

As a workaround approach, a phantom may be imaged. The phantom is designed to mimic specific regions and organs of typical patients, and may include fillable structures to mimic organs/objects of interests, such as refillable spheres to mimic lesions with different size and uptake. A phantom provides an imaging subject for which the ground truth may be known (e.g., the fillable sphere representing a tumor may include a quantity of radioactive material designed to output the intended radioactivity). However, the phantom does not precisely mimic the complexity of the human anatomy, and this introduces its own uncertainty as to whether imperfections of the phantom (as compared with real human anatomy) have meaningful impact on the simulation results.

Another approach is to generate a hybrid imaging data set which combines simulated tumor data with actually acquired patient imaging data (e.g. from a healthy human subject). The tumor data simulation is performed for the target design-basis activity level (e.g. SUV value). The resulting hybrid dataset is expected to have known quantitation of the tumors/lesions in the clinically relevant background of the actually acquired patient data.

In one approach for generating hybrid imaging data, artificial lesions with known quantitation are added to the reconstructed volume image of the patient, the lesions are re-projected to generate the projection data of the artificial lesions, and this lesion projection data is then added to the projection data of the patient data to obtain the hybrid dataset. See Asma E, et al, "Accurate and consistent lesion quantitation with clinically acceptable penalized likelihood images," IEEE NSS/MIC conference record, M23-7, pp. 4062-4066, 2012. Another known approach is to fill spheres of certain sizes and acquire data of such spheres suspended in air in the system that is used for patient studies. The acquired data of the spheres are then added to patient data, scaled for acquisition time, patient attenuation, and so forth. See Daube-Witherspoon, et al, "Determination of accuracy and precision of lesion update measurement in human subject with time-of-flight PET," J Nucl Med 2014; 55:1-6. Another approach for generating hybrid data for PET data processing evaluations uses Monte Carlo simulation to create inserted lesions. See Stute S et al, LuCaS: Efficient Monte Carlo simulations of highly realistic PET tumor images," IEEE NSS Conference proceedings, M06-241, 2008.

The following discloses new and improved systems and methods.

SUMMARY

In one disclosed aspect, a non-transitory computer readable medium stores instructions readable and executable by an imaging workstation including at least one electronic processor to perform a dataset generation method operating on emission imaging data acquired of a patient for one or more axial frames at a corresponding one or more bed positions, the method comprising: (a) identifying a frame of interest from the one or more axial frames; (b) generating simulated lesion data by simulating emission imaging data for the frame of interest of at least one simulated lesion placed in the frame of interest; (c) generating simulated frame emission imaging data by simulating emission imaging data for the frame of interest of the patient; (d) determining a normalization factor comprising a ratio of the value of a quantitative metric for the simulated data and the value of the quantitative metric for the emission imaging data acquired of the patient for the frame of interest; and (e) generating a hybrid data set comprising the emission imaging data acquired of the patient for the one or more axial frames at the corresponding one or more bed positions with the frame of interest replaced by a combination of the simulated lesion data scaled (in some examples, time-scaled) by the normalization factor and the emission imaging data acquired of the patient for the frame of interest.

In another disclosed aspect, an imaging system includes an image acquisition device configured to acquire one or more images of a patient. At least one electronic processor is programmed to: (a) receive emission imaging data acquired of a patient for one or more axial frames at a corresponding one or more bed positions from the image acquisition device; (b) identify a frame of interest from the one or more axial frames; (c) generate simulated lesion data by simulating emission imaging data for the frame of interest of at least one simulated lesion placed in the frame of interest; (d) generate simulated frame emission imaging data by simulating emission imaging data for the frame of interest of the patient; (e) determine a normalization factor comprising a ratio of the value of a quantitative metric for the simulated data and the value of the quantitative metric for the emission imaging data acquired of the patient for the frame of interest; and (f) generate a hybrid data set comprising the emission imaging data acquired of the patient for the one or more axial frames at the corresponding one or more bed positions with the frame of interest replaced by a combination of the simulated lesion data scaled by the normalization factor and the emission imaging data acquired of the patient for the frame of interest.

In another disclosed aspect, an imaging system includes an image acquisition device configured to acquire one or more images of a patient. At least one electronic processor is programmed to: (a) receive emission imaging data acquired of a patient for one or more axial frames at a corresponding one or more bed positions from the image acquisition device; (b) identify a frame of interest from the one or more axial frames; (c) generate simulated lesion data by simulating emission imaging data for the frame of interest of at least one simulated lesion placed in the frame of interest by simulating emission imaging data for the frame of interest of at least one simulated lesion placed in the frame of interest includes simulating the emission imaging data for the frame of interest of the at least one simulated lesion placed in the frame of interest using a Monte Carlo simulator; (d) generate simulated frame emission imaging data by simulating emission imaging data for the frame of interest of the patient by simulating emission imaging data for the frame of interest of the patient includes simulating the emission imaging data for the frame of interest of the patient using the Monte Carlo simulator; (e) determine a normalization factor comprising a ratio of the value of a quantitative metric for the simulated data and the value of the quantitative metric for the emission imaging data acquired of the patient for the frame of interest; (f) generate a hybrid data set comprising the emission imaging data acquired of the patient for the one or more axial frames at the corresponding one or more bed positions with the frame of interest replaced by a combination of the simulated lesion data scaled by the normalization factor and the emission imaging data acquired of the patient for the frame of interest; (g) reconstruct each frame of the hybrid data set to generate a corresponding frame image; (h) knit together the frame images to generate a hybrid reconstructed image; and (i) display, on a display device, at least a portion of the hybrid reconstructed image corresponding to the frame of interest.

One advantage resides in providing improved evaluation and optimization of a medical imaging device, software, and algorithms employed for quantitative molecular imaging.

Another advantage resides in providing such improved evaluation and optimization in the context of the medical imaging device acquiring emission imaging data of a patient for one or more axial frames at a corresponding one or more bed positions.

Another advantage resides in providing such improved evaluation and optimization taking into account the impact of acquisition over successive axial frames at corresponding bed positions, especially at knitted boundaries of neighboring axial frames.

Another advantage resides in providing hybrid imaging data having simulated lesion data with acquired emission imaging data of a patient.

Another advantage resides in providing hybrid imaging data with simulated data that is normalized to acquired emission imaging data of a patient.

Another advantage resides in acquiring simulated lesion data in a patient without having to physically acquire lesion data.

Another advantage resides in inserting simulated lesions of various sizes, shapes, and locations in patient imaging data.

Another advantage resides in providing non-uniform attenuation at different locations in the patient by using the attenuation map of the patient in the simulation.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the invention.

DETAILED DESCRIPTION

Figure 1:
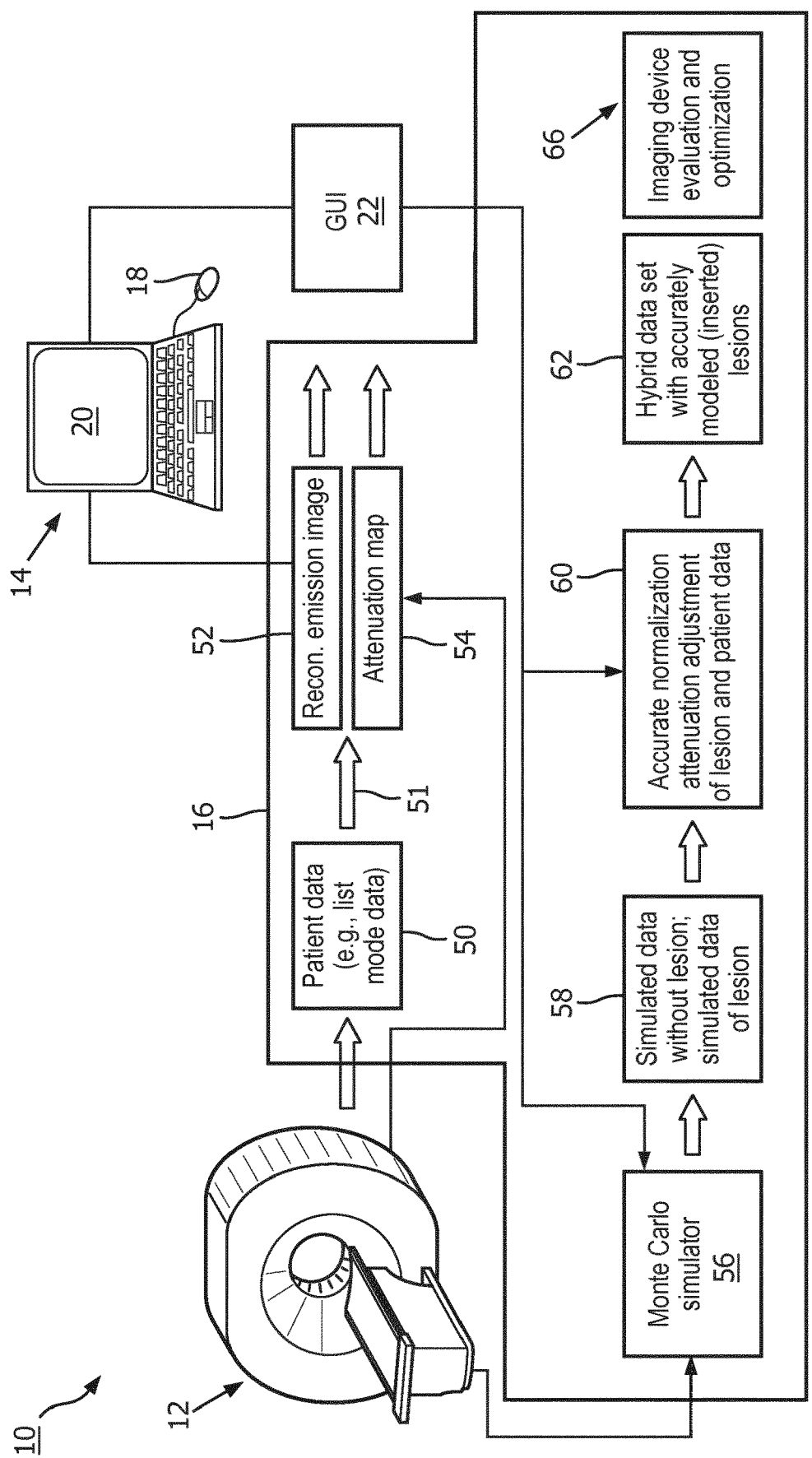
FIG. 1 diagrammatically shows an imaging system according to one aspect.

The following discloses approaches for generating a hybrid data set that combine projection data actually acquired for an imaging subject with tumor projection data simulated by a Monte Carlo simulator. In one approach, the lesions are inserted into the reconstructed volume image of a patient and then the lesions are re-projected to generate projection data of the artificial lesions, which is then added to the patient projection data. However, this approach does not accurately account for the impact of limited FOV when the reconstructed volume image is generated from emission imaging data acquired over several axial "frames" at corresponding bed positions. The approach also fails to capture system physics beyond that embodied by the reconstructed image volume. It also fails to account for the possibly different attenuation of the lesions as compared with the background body tissue.

An improved approach performs Monte Carlo simulation for each successive frame. A simulation is first done of the patient without the added lesions, using the actual attenuation map used in acquiring the actual patient data. The simulated patient data set is compared with the actually acquired patient data set (after conversion to SUV) to determine the normalization factor which matches the simulated patient data and the actual measured patient data for the frame under processing.

A second Monte Carlo simulation is performed for the lesions of the desired activity level (with offset correction for the patient tissue background activity), again using the patient's attenuation map. Alternatively, the second simulation can be for the patient with the lesions after which the simulated lesions data is segregated out. The simulations are done for the same set of frames used in acquiring the actual patient data, so as to capture effects such as reduced sensitivity at the axial peripheries of the frame. The normalization factor previously generated is used to scale the simulated lesion data, which is then added to the actual patient projection data to generate the hybrid projection dataset. In one approach, the lesion data are scaled during the Monte Carlo simulation by adjusting the simulated acquisition time in accord with the normalization factor.

The axial field of view (FOV) of the PET scanner is typically on the order of 15-25 centimeters (the precise FOV depends on the geometry of the PET scanner, e.g. the number and axial width of PET detector rings). This axial FOV is insufficient to perform a whole-body PET scan of a patient in a single acquisition. Accordingly, the whole-body PET scan is performed by moving the patient stepwise through the PET scanner in successive axial steps. Each step is referred to herein as a bed position (so named because the stepwise movement of the patient is achieved by moving the patient bed from one axial bed position to the next in the succession). At each bed position, a frame of imaging data is acquired—the frame has an axial extent commensurate with the axial FOV of the PET scanner, and is located along the axial direction of the patient at the current bed position. Neighboring frames are typically arranged to be partially overlapping by a few centimeters to ensure complete coverage of the patient and to compensate for reduced sensitivity at the axial ends of each frame. The PET imaging data of each frame are reconstructed to generate corresponding "frame images", which are then knitted together (e.g. taking into account the tail-off of sensitivity at the peripheries) to form the whole-body image.

Each axial frame can be identified with a corresponding axial section of the reconstructed whole body image. However, the axial section of the whole body image generally differs from the frame image due to contributions to the axial section of the reconstructed whole body image from neighboring frames introduced during the knitting together of the frame images to form the complete whole-body image.

Existing techniques utilize a continuous bed motion acquisition technique for a whole body scan. In such acquisitions, the axial frame or bed position does exist in the image. However, the data can be rebinned into virtual frames. A simulation package can model such bed motion and use the corresponding virtual frames to carry out the rest of a normalization and hybrid generation techniques, as described in more detail below.

With reference to FIG. 1, an illustrative medical imaging system 10 is shown. As shown in FIG. 1, the system 10 includes an image acquisition device 12. In one example, the image acquisition device 12 can comprise an emission imaging device (e.g., a transmission computed tomography (CT) device, positron emission tomography (PET) device, a single photon emission computed tomography (SPECT) device, a combined PET/CT imaging device, or the like); however, it will be appreciated that other suitable imaging modalities may be used. The system 10 also includes a computer or imaging workstation or other electronic data processing device 14 with typical components, such as at least one electronic processor 16, at least one user input device (e.g., a mouse, a keyboard, a trackball, and/or the like) 18, and a display device 20 on which an interactive abnormality/lesion insertion graphical user interface (GUI) 22 can be displayed. In some embodiments, the display device 20 can be a separate component from the computer 14. The workstation 14 can be in electronic communication with one or more databases (not shown) (e.g., an electronic medical record (EMR) database, a picture archiving and communication system (PACS) database, and the like).

As shown in FIG. 1, the electronic processor 16 is programmed to perform image acquisition and image processing. For example, the electronic processor 16 is programmed to receive imaging data from the image acquisition device 12 and sort the images into list mode data 50. The electronic processor 16 is also programmed to perform reconstruction operations (diagrammatically indicated by arrow) 51 on the list mode data to generate a reconstructed emission image 52, and also generate an attenuation map 54 from a corresponding anatomical image, e.g. a transmission computed tomography (CT) image generated by a CT modality of a combined PET/CT or SPECT/CT imaging device.

As further shown in FIG. 1, the electronic processor 16 is programmed to implement a Monte-Carlo simulator 56. In some simulation tasks relevant herein, imaging data are simulated for the imaging subject as represented by the reconstructed images 52, and/or for tumors simulated to be in the imaging subject. The Monte-Carlo simulation of emission data is performed by sampling emissions (e.g. PET 511 keV gamma emission pair events) for a given distribution of radiopharmaceutical. The sampled distribution may be the radiopharmaceutical distribution in the subject, as represented by the reconstructed emission image 52, or may be the radiopharmaceutical distribution in a (hypothetical) tumor positioned in the subject, or a combination of the patient and tumor distributions. The Monte Carlo simulator 56 also takes into account absorption statistics for the emission events, using the attenuation map 54, with random sampling to determine possible outcomes.

The Monte-Carlo simulator 56 simulates emission data 58 for the patient without lesions (using the emission image 52 as the radiopharmaceutical distribution) and for the (hypothetical) lesions (or, in an alternative embodiment, for the lesions in the patient after which the emission data for the lesions is segregated out). In normalization operations 60, a comparison of the actual emission imaging data 50 and the simulated patient imaging data (without implanted lesions) is compared to generate a normalization of the emission data for the lesions. The simulated lesion data scaled by the normalization factor and the emission imaging data acquired of the patient are combined to generate a hybrid data set 62. Generally, the abnormality/lesion insertion GUI 22 allows flexibility for manual or automatic lesion insertion setup so that the Monte Carlo simulations 54 accurately model the emission data for a given clinical scenario. An accurate normalization process 60 assures the lesion has the intended quantitation (SUV) after inserting to the patient data. The attenuation adjustment of the patient data assures the patient data is adjusted if there is extra attenuation from the lesion tissue. The resulting hybrid data set 62 has accurately modeled lesion data inserted to the patient data background.

The hybrid data set 62 comprises list mode data and constitutes a simulation of the list mode data that would be acquired for the imaging subject from which the patient data 50 were acquired if that imaging subject had the tumors simulated by the Monte Carlo simulator 56. Using techniques disclosed herein, the simulation accurately accounts for effects such as attenuation and the impact of lower sensitivity at the axial peripheries of the axial frames of emission imaging data acquired via axial frames at corresponding bed positions (e.g. to perform a whole-body PET scan). Thus, the hybrid data set 62 may be variously employed in imaging device evaluation and/or optimization 66 to evaluate performance of the imaging device 12, to optimize aspects of the imaging device 12 such as parameters of the image reconstruction 51 and/or optional image processing such as resolution recovery, use of regularization, post-reconstruction image filtering, and/or so forth.

The at least one electronic processor 16 is operatively connected with a non-transitory storage medium (not shown) that stores instructions which are readable and executable by the at least one electronic processor 16 to perform disclosed operations 51, 60 and to implement the Monte Carlo simulator 56 and to perform other operations as appropriate (e.g. the imaging device evaluation and/or optimization 66, and/or in some embodiments control instructions that are executed to control the imaging device 12 to acquire the data 52, 54, and/or so forth). The non-transitory storage medium may, for example, comprise a hard disk drive, RAID, or other magnetic storage medium; a solid state drive, flash drive, electronically erasable read-only memory (EEROM) or other electronic memory; an optical disk or other optical storage; various combinations thereof; or so forth.

The illustrative electronic processor 16 is part of the illustrative imaging workstation 14; however, more generally the system may include one or more electronic processors variously distributed. For example, in one contemplated embodiment the reconstructed emission image 52 and attenuation map 54 are stored in a PACS and thereafter are retrieved by a network server, cloud computing resource, or the like including an electronic processor (or set of electronic processors, possibly combined in an ad hoc fashion as in cloud computing) which implements the Monte Carlo simulator 56 and processing 60 to generate the hybrid data set 62, and optionally also the imaging device evaluation and/or optimization 66.

Figure 2:
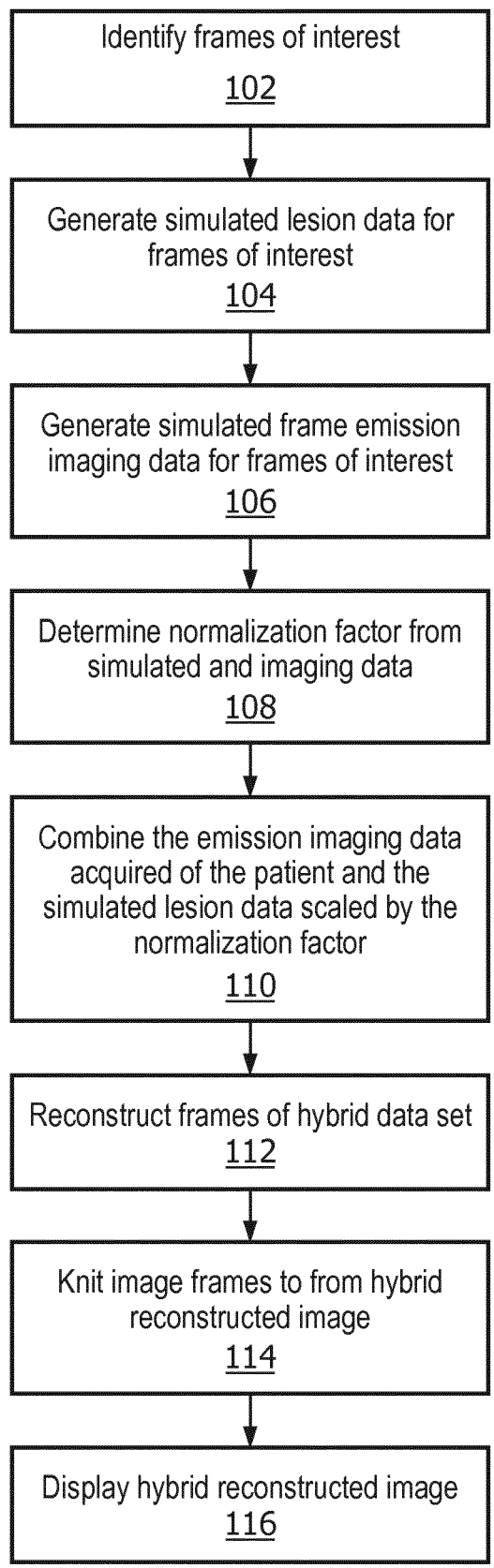
FIG. 2 shows an exemplary flow chart operation of the system of FIG. 1.

The hybrid dataset generation operates on emission imaging data acquired of a patient for one or more axial frames at a corresponding one or more bed positions. With reference to FIG. 2, an illustrative embodiment of the hybrid dataset generation operations is diagrammatically shown as a flowchart. At 102, a frame of interest is identified from the one or more axial frames. In some embodiments, the one or more axial frames include a plurality of axial frames at successive bed positions. For example, the emission imaging data acquired of the patient for the plurality of axial frames at successive bed positions forms a whole body emission imaging data set.

At 104, simulated lesion data is generated by simulating emission imaging data for the frame of interest of at least one simulated (e.g., 1 cm diameter sphere filled with certain activity) lesion placed in the frame of interest. The operation 104 is suitably performed by the Monte Carlo simulator 56. Operation 104 can be implemented by simulating the lesion(s) without surrounding activity (but using the attenuation map 54 to generate matching attenuation/scattering as in the patient data). By simulating for a frame, the effect of reduced sensitivity near the edges of the frame can be appropriately accounted for.

At 106, simulated frame emission imaging data is generated by simulating emission imaging data for the frame of interest of the patient. The operation 106 is again suitably performed by the Monte Carlo simulator 56, but here with the radiopharmaceutical distribution being represented by the reconstructed emission image 52 of the patient. The operation 106 again uses the (same) attenuation map 54 as is used in operation 104 to account for absorption/scattering. In the case where the reconstructed image activity (i.e. emission image 52) extends outside of the frame of interest (as is usually the case for a whole-body PET scan acquired using a plurality of frames), the Monte Carlo simulator 56 may take into account the impact of out-of-field of view (out of FOV) activity again leveraging the attenuation map 54.

In a variant approach, operations 104 and 106 can be implemented by simulating the lesion(s) together with the imaging subject as represented by the reconstructed emission image 52. In this approach, each sampled emission (e.g. each 511 keV gamma pair in the case of PET) is tagged with its source location, and the lesion emission data can then be identified and segregated out from the patient imaging data in post-simulation processing.

At 108, a normalization factor is determined comprising a ratio of the value of a quantitative metric for the simulated patient data and the value of the quantitative metric for the portion of the emission imaging data 50 actually acquired of the patient for the frame of interest. For example, the quantitative metric may be a mean activity or standardized uptake value (SUV) for a total number of events (i.e., counts) in the acquired imaging data and the simulated imaging data for the frame of interest. This normalization factor accounts for any difference in sensitivity of the actual imaging device 12 as compared with the Monte Carlo simulator 56.

At 110, a hybrid data set is generated that combines the original emission imaging data 50 acquired of the patient for the one or more axial frames at the corresponding one or more bed positions with the frame of interest and the simulated lesion data scaled by the normalization factor. For example, the generation of the hybrid data set includes scaling the simulated lesion data by the normalization factor by adjusting the simulation time when simulating the emission imaging data for the frame of interest of at least one simulated lesion placed in the frame of interest in accord with the normalization factor.

In the case of a whole body PET scan or other multi-frame data acquisition, the operations 102-110 may be repeated for at least one additional frame of interest of the one or more axial frames at the successive bed positions (e.g. for all frames into which at least one lesion is to be inserted). If the lesion(s) to be inserted in the overlapping region of to adjacent frames, the simulation operations 102-110 need to be performed for these two frames separately.

The operations 102-110, repeated for all frames into which at least one lesion is to be inserted, outputs the hybrid data set 62 of FIG. 1. The remaining operations 112, 114, 116 of FIG. 2 present a suitable implementation of the imaging device evaluation/optimization operation 66 of FIG. 1.

At 112, each frame of the hybrid data set is reconstructed to generate a corresponding frame image. The reconstruction should implement the image reconstruction processing under evaluation or optimization, and may include ancillary operations such as post-reconstruction image filtering.

At 114, the frame images are knitted together to generate a hybrid reconstructed image. Again, this should employ the frame image fusion processing of the image reconstruction processing under evaluation or optimization, and may include operations such as smoothing of overlapping portions of neighboring frame images.

At 116, at least a portion of the hybrid reconstructed image corresponding to the frame of interest is displayed on the display device 20. Additionally to (or, optionally, in place of) displaying the hybrid reconstructed image, the operation 116 may include quantitative processing such as quantifying the SUV of the tumor(s) in the hybrid reconstructed image. Ideally, these SUV values should match the "ground truth" values of the SUV values of the hypothetical, i.e. simulated, lesions employed in the simulation operation 104. If the SUV values in the hybrid reconstructed image deviate significantly from these ground truth values, this implies the images of lesions produced by the imaging device 12 with reconstruction 51 implemented as in operations 112, 114 are not accurately reflecting the true SUV values of the lesions. This may be corrected by improving the reconstruction, or may be corrected heuristically, e.g. by applying an empirical scaling factor to match the hybrid image SUV values with the known ground truth SUV values.

For optimization tasks, the operations 112, 114, 116 may be repeated for a test grid of reconstruction parameters or for other variables undergoing optimization, and the results of the operation 116 for the various options used to select optimal parameter values or for other optimization.

Figure 3A:
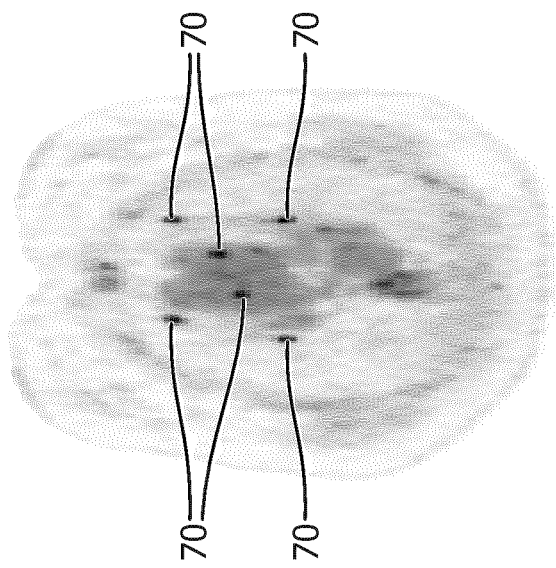
FIGS. 3A-3C illustratively show example images reconstructed from a hybrid data set displayed on the system of FIG. 1.
Figure 3B:
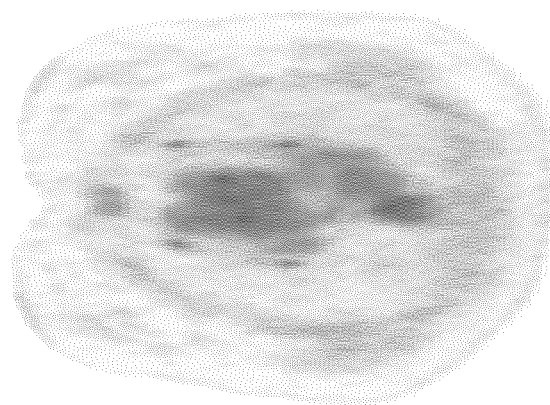
Figure 3C:
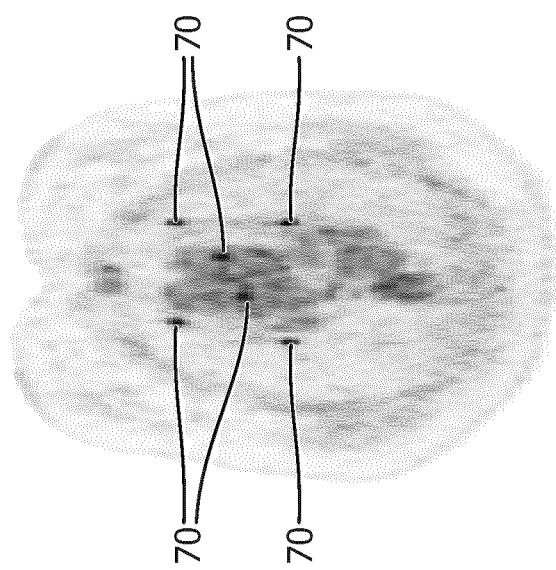

With continuing reference to FIGS. 1 and 2, FIGS. 3A-3C show examples of images produced using operations 112 and 114. These images are generated from a hybrid data set, in which six small lesions 70 were inserted to the data of a patient study. For example, FIG. 3A shows an image that is reconstructed using a list-mode Maximum Likelihood Estimation Method (MLEM) algorithm. FIG. 3B shows an image generated using the list-mode MLEM algorithm with regularized reconstruction using a quadratic prior for noise reduction. FIG. 3C shows an image generated using the list-mode MLEM algorithm with regularized reconstruction using an edge-preserving prior for noise reduction while maintaining lesion contrast. The lesion contrast and definition, as well as the background noise in the images clearly demonstrated the performance differences between the three different reconstruction approaches. In contrast, without the inserted lesions, one would only see the background noise difference between the different reconstruction approaches. These images may be displayed on the display device 20.

It will be appreciated that, for typical clinical studies, dead time won't be a big issue. For high count rate studies, dead time has much stronger impact. A Monte Carlo simulation of isolated lesions alone might not simulate the same level of dead time factors as the original patient data. In the normalization steps described above, the data can be simulated with both the background and the lesion. And from the simulated data, the events from the lesion and those from the background can be separated. In this way, if the total count level is high, the dead time effect can be correctly modelled as well.

To reduce the simulation time, multiple approaches can be applied, such as, performing the Monte Carlo simulation 54 for reduced time and scale the results to the patient data count level. Scaling is not exactly equivalent to simulating with full acquisition time, but for some studies (e.g. SUV number), the results are equivalent when the counts are large. Other effects (e.g. decay) also can be included in the scaling factor.

In those cases when the inserted lesions cause higher attenuation from lesion mass than the corresponding tissue in the original data to be merged with, special considerations need to be taken. For example, during attenuation, all the events from the patient data that intercept with the inserted lesion are first identified and the extra attenuation from the lesion is calculated along the direction of each event. A random number is generated to determine if the event is going to be removed from the data (to mimic additional attenuation). The probability that an event is removed from the final data is proportional to the extra attenuation from the inserted lesion. This will enable the insertion of lesions with the real lesion density (usually close to that of soft tissue) in lungs.

EXAMPLE

The following is an example algorithm, implemented on the electronic processor 16, to perform the disclosed operations:

Step 1. From a whole body patient study, obtain the reconstructed whole body image, scale the image (grayscale intensity voxel values) to an activity map, assuming the total activity is A, to obtain the activity map (image_WB_act); The A only needs to be roughly the same as for the activity level at the time the patient scan started to minimize dead time difference between the patient scan and the later in Monte Carlo simulation;

Step 2. Identify the section of the image corresponding to the frame of interest (image_Frame_act);

Step 3. Calculate the whole body mean of image_WB_act (mean_WB), generate a lesion at the location of interest in image_Frame_act, assuming the activity is lesion_SUV*mean_WB, where lesion_SUV is the desired SUV value of the lesion to be inserted into the patient;

Since the list-mode data from the lesion will be eventually added to that of the acquired list-mode data of the patient, the lesion activity should be offset by the value at the location of the lesion in image_WB_act, assuming lesion_act_Local i.e., the lesion activity for simulation should be act lesion=lesion_SUV*mean_WB−lesion_act_Local. Additional smoothing may be applied to image_WB_act in the inserted lesion location to reduce uncertainty related to noise.

Step 4. Use image_Frame_act and the corresponding attenuation map to simulate the list mode data of the frame without the lesion (LM_Frame_simu), assuming acquisition time T (or the fraction of T for the improved computational performance but later scaling the result appropriately);

Step 5. From the patient list mode data, identify the portion corresponding to the same frame (LM_Frame);

Step 6. Reconstruct the LM_Frame and LM_Frame_simu into IM_Frame and IM_Frame_simu.

Step 7. Find the ratio of the total of IM_Frame and IM_Frame_simu. This gives the normalization factor between the simulation and real data: Norm1=IM_Frame/IM_Frame_simu Step 8. Find the mean of image_Frame_act: mean_Frame, calculate ratio of mean of the whole body to the mean of the frame: Norm2=mean_WB/mean_Frame. Note that this step is to take care of the potential that the mean of the frame is different from the mean of the whole body;

Step 9. Scale the time T by Norm1*Norm2, then use the lesion and the same attenuation map of the frame to simulate the list mode data of the lesion (LM_Lesion_simu), assuming acquisition time T*(Norm1*Norm2). If the attenuation coefficient of the lesion to be inserted is different from that at the location of the attenuation map of the map, such as in the situation of inserting lesions in lungs, use the attenuation map with inserted extra attenuation from lesion;

Step 10. Add LM_Lesion_simu to LM_Frame to simulate the patient data with inserted lesion with true SUV value of lesion_SUV.

The disclosure has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A non-transitory computer readable medium storing instructions readable and executable by an imaging workstation including at least one electronic processor to perform a dataset generation method operating on emission imaging data acquired of a patient for one or more axial frames at a corresponding one or more bed positions, the method comprising:
    (a) identifying a frame of interest from the one or more axial frames;
    (b) generating simulated lesion data by simulating emission imaging data for the frame of interest of at least one simulated lesion placed in the frame of interest using an attenuation map of the patient;
    (c) generating simulated frame emission imaging data by simulating emission imaging data for the frame of interest of the patient using the same attenuation map of the patient as is used in the operation (b);
    (d) determining a normalization factor comprising a ratio of the value of a quantitative metric for the simulated frame emission imaging data and the value of the quantitative metric for the emission imaging data acquired of the patient for the frame of interest; and
    (e) generating a hybrid data set comprising the emission imaging data acquired of the patient for the one or more axial frames at the corresponding one or more bed positions with the frame of interest replaced by a combination of the simulated lesion data scaled by the normalization factor and the emission imaging data acquired of the patient for the frame of interest.

2. The non-transitory computer readable medium of claim 1, wherein the operation (b) comprises one of:
    simulating emission imaging data for the frame of interest of at least one simulated lesion placed in the frame of interest in isolation; and
    simulating combined emission imaging data for the frame of interest of at least one simulated lesion placed in the frame of interest together with the patient and then segregating out the simulated lesion data from the simulated combined emission imaging data; wherein the quantitative metric is a total number of events in the acquired imaging data and the simulated imaging data for the frame of interest.

3. The non-transitory computer readable medium of claim 1, wherein in the operation (b) further includes:
    reconstructing the emission imaging data acquired of the patient for the frame of interest and determining a background activity or standardized uptake value (SUV) at the location of at least one simulated lesion placed in the frame of interest; and
    offsetting an activity or SUV of the simulated lesion by the background activity or SUV.

4. The non-transitory computer readable medium of claim 3, wherein operation (e) includes scaling the simulated lesion data by the normalization factor by adjusting a time of the simulation of the emission imaging data for the frame of interest of at least one simulated lesion placed in the frame of interest in accord with the normalization factor.

5. The non-transitory computer readable medium of claim 4, wherein:
    operation (b) simulates the emission imaging data for the frame of interest of the at least one simulated lesion placed in the frame of interest using a Monte Carlo simulator; and
    operation (c) simulates the emission imaging data for the frame of interest of the patient using the Monte Carlo simulator.

6. The non-transitory computer readable medium of claim 1, wherein the dataset generation method further includes:
    (f) reconstructing each frame of the hybrid data set to generate a corresponding frame image;
    (g) knitting together the frame images to generate a hybrid reconstructed image; and
    (h) displaying, on a display device, at least a portion of the hybrid reconstructed image corresponding to the frame of interest.

7. An imaging system, comprising:
    an image acquisition device configured to acquire one or more images of a patient;
    at least one electronic processor programmed to:
        (a) receive emission imaging data acquired of a patient for one or more axial frames at a corresponding one or more bed positions from the image acquisition device;
        (b) identify a frame of interest from the one or more axial frames;
        (c) generate simulated lesion data by simulating emission imaging data for the frame of interest of at least one simulated lesion placed in the frame of interest using an attenuation map of the patient;
        (d) generate simulated frame emission imaging data by simulating emission imaging data for the frame of interest of the patient using the same attenuation map of the patient;
        (e) determine a normalization factor comprising a ratio of the value of a quantitative metric for the simulated frame emission imaging data and the value of the quantitative metric for the emission imaging data acquired of the patient for the frame of interest; and
        (f) generate a hybrid data set comprising the emission imaging data acquired of the patient for the one or more axial frames at the corresponding one or more bed positions with the frame of interest replaced by a combination of the simulated lesion data scaled by the normalization factor and the emission imaging data acquired of the patient for the frame of interest.

8. The system of claim 7, wherein the one or more axial frames include a plurality of axial frames at successive bed positions.

9. The system of claim 8, wherein the image acquisition device is configured to acquire the emission imaging data of the patient for the plurality of axial frames at successive bed positions forms a whole body emission imaging data set.

10. The system of claim 7, further including repeating (a)-(f) for at least one additional frame of interest of the one or more axial frames at the successive bed positions.

11. The system of claim 7, wherein generating simulated lesion data by simulating emission imaging data for the frame of interest of at least one simulated lesion placed in the frame of interest comprises one of:

simulating emission imaging data for the frame of interest of at east one simulated lesion placed in the frame of interest in isolation; and simulating combined emission imaging data for the frame of interest of at least one simulated lesion placed in the frame of interest together with the patient and then segregating out the simulated lesion data from the simulated combined emission imaging data.

12. The system of claim 7, wherein the quantitative metric is a total number of events in the acquired imaging data and the simulated imaging data for the frame of interest.

13. The system of claim 12, wherein generating simulated lesion data by simulating emission imaging data for the frame of interest of at least one simulated lesion placed in the frame of interest further includes:

reconstructing the emission imaging data acquired of the patient for the frame of interest and determining a background activity or standardized uptake value (SUV) at the location of at least one simulated lesion placed in the frame of interest; and offsetting an activity or SUV of the simulated lesion by the background activity or SUV.

14. The system of claim 13, wherein generating a hybrid data set comprising the emission imaging data acquired of the patient for the one or more axial frames at the corresponding one or more bed positions with the frame of interest replaced by a combination of the simulated lesion data scaled by the normalization factor and the emission imaging data acquired of the patient for the frame of interest includes:

scaling the simulated lesion data by the normalization factor by adjusting a time of the simulation of the emission imaging data for the frame of interest of at least one simulated lesion placed in the frame of interest in accord with the normalization factor.

15. The system of claim 7, wherein:

generating simulated lesion data by simulating emission imaging data for the frame of interest of at least one simulated lesion placed in the frame of interest includes simulating the emission imaging data for the frame of interest of the at least one simulated lesion placed in the frame of interest using a Monte Carlo simulator; and generating simulated frame emission imaging data by simulating emission imaging data for the frame of interest of the patient includes simulating the emission imaging data for the frame of interest of the patient using the Monte Carlo simulator.

16. The system of claim 7, wherein the at least one electronic processor is further programmed to:

(g) reconstruct each frame of the hybrid data set to generate a corresponding frame image;

(h) knit together the frame images to generate a hybrid reconstructed image; and (i) display, on a display device, at least a portion of the hybrid reconstructed image corresponding to the frame of interest.

17. The imaging system of claim 7, wherein:

the at least one electronic processor is programmed to generate the simulated lesion data by simulating the emission imaging data for the frame of interest of the at least one simulated lesion placed in the frame of interest using a Monte Carlo simulator;

the at least one electronic processor is programmed to generate the simulated frame emission imaging data by simulating the emission imaging data for the frame of interest of the patient using the Monte Carlo simulator; and the at least one electronic processor is further programmed to:

(g) reconstruct each frame of the hybrid data set to generate a corresponding frame image;

(h) knit together the frame images to generate a hybrid reconstructed image; and (i) display, on a display device, at least a portion of the hybrid reconstructed image corresponding to the frame of interest.

18. The non-transitory computer readable medium of claim 1, wherein the one or more axial frames include a plurality of axial frames at successive bed positions; and the emission imaging data acquired of the patient for the plurality of axial frames at successive bed positions forms a whole body emission imaging data set.

* * * * *